United States Patent
Mantor et al.

(10) Patent No.: US 10,546,365 B2
(45) Date of Patent: Jan. 28, 2020

(54) SINGLE PASS FLEXIBLE SCREEN/SCALE RASTERIZATION

(71) Applicants: ADVANCED MICRO DEVICES, INC., Santa Clara, CA (US); ATI TECHNOLOGIES ULC, Markham (CA)

(72) Inventors: Michael Mantor, Orlando, FL (US); Laurent Lefebvre, Markham (CA); Mika Tuomi, Noormakuu (FI); Kiia Kallio, Noormakuu (FI)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 15/843,968

(22) Filed: Dec. 15, 2017

(65) Prior Publication Data
US 2018/0276790 A1    Sep. 27, 2018

Related U.S. Application Data

(60) Provisional application No. 62/477,149, filed on Mar. 27, 2017.

(51) Int. Cl.
| G06T 3/40 | (2006.01) |
| G06T 1/20 | (2006.01) |
| G06T 3/00 | (2006.01) |
| G06T 15/80 | (2011.01) |
| G06T 15/00 | (2011.01) |

(52) U.S. Cl.
CPC .................. *G06T 3/40* (2013.01); *G06T 1/20* (2013.01); *G06T 3/0093* (2013.01); *G06T 15/005* (2013.01); *G06T 15/80* (2013.01); *G06T 2210/12* (2013.01); *G06T 2210/36* (2013.01)

(58) Field of Classification Search
None
See application file for complete search history.

(56) References Cited

U.S. PATENT DOCUMENTS

| 8,760,467 | B2 | 6/2014 | Peterson |
| 2014/0267232 | A1* | 9/2014 | Lum ...................... G06T 17/00 345/419 |

(Continued)

OTHER PUBLICATIONS

International Search Report and Written Opinion dated Jun. 28, 2018 in Application No. PCT/US2018/022693, 15 pages.

(Continued)

*Primary Examiner* — YuJang Tswei

(57) ABSTRACT

An apparatus, such as a head mounted device (HMD), includes one or more processors configured to implement a graphics pipeline that renders pixels in window space with a nonuniform pixel spacing. The apparatus also includes a first distortion function that maps the non-uniformly spaced pixels in window space to uniformly spaced pixels in raster space. The apparatus further includes a scan converter configured to sample the pixels in window space through the first distortion function. The scan converter is configured to render display pixels used to generate an image for display to a user based on the uniformly spaced pixels in raster space. In some cases, the pixels in the window space are rendered such that a pixel density per subtended area is constant across the user's field of view.

20 Claims, 13 Drawing Sheets

(56) References Cited

U.S. PATENT DOCUMENTS

| | | | |
|---|---|---|---|
| 2015/0287166 A1 | 10/2015 | Cerny | |
| 2015/0287167 A1* | 10/2015 | Cerny | G06T 17/10 |
| | | | 345/423 |
| 2015/0287232 A1* | 10/2015 | Cerny | G06T 15/005 |
| | | | 345/501 |
| 2016/0180501 A1* | 6/2016 | Mallet | G06T 3/0018 |
| | | | 382/164 |
| 2016/0307297 A1 | 10/2016 | Akenine-Moller et al. | |
| 2016/0335806 A1 | 11/2016 | Chan et al. | |
| 2016/0379335 A1* | 12/2016 | Kwon | G06T 1/20 |
| | | | 345/506 |

OTHER PUBLICATIONS

Toth, Robert, et al., "Comparison of Projection Methods for Rendering Virtual Reality", Intel Software Developer Zone website: https://software.intel.com/en-us/articles/comparison-of-projection-methods-for-rendering-virtual-reality, Jun. 17, 2016 (accessed Jul. 16, 2018), 9 pages.

International Preliminary Report on Patentability dated Oct. 10, 2019 for International Application No. PCT/US2018/022693, 12 pages.

* cited by examiner

SINGLE PASS FLEXIBLE SCREEN/SCALE RASTERIZATION

CROSS REFERENCE TO RELATED APPLICATIONS

This application claims priority to the U.S. Provisional Patent Application Ser. No. 62/477,149 filed on Mar. 27, 2017 and entitled "Single Pass Flexible Screen/Scale Rasterization," which is hereby incorporated by reference in its entirety.

BACKGROUND

Graphics processors generate images for head mounted displays (HMDs) in augmented reality (AR) and virtual reality (VR) applications using a sequence of programmable shaders and fixed function hardware blocks. For example, a 3-D model of an object that is visible in a frame is represented by a set of primitives such as triangles, other polygons, or patches which are processed in a graphics pipeline to produce values of pixels for display to a user. Pixels are typically rendered in window space with uniform pixel spacing across the window. Consequently, the pixel density per subtended angle increases with pixel distance from a central gaze direction of a user or a center of a lens in the HMD. The pixels are sampled at regular intervals by a scan converter to produce a rectangular image. A post processing step distorts the rectangular image so that the image appears regular when a user views the image through a set of display lenses, e.g., when the user is wearing an HMD.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
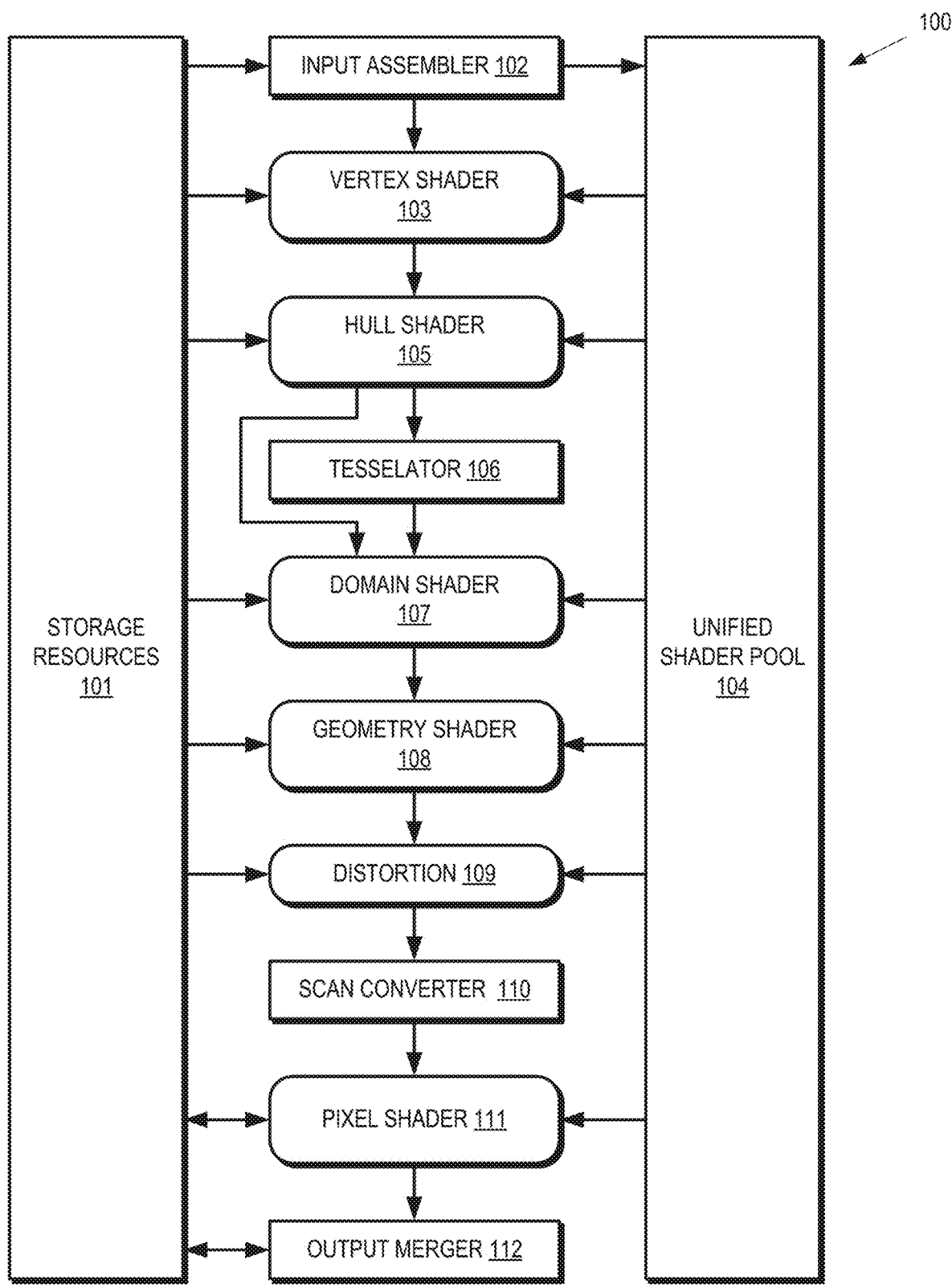
FIG. 1 is a block diagram of a graphics pipeline that implements a DX12 application programming interface (API) according to some embodiments.

Significant processing power is wasted in rendering uniformly spaced pixels in window space because the high pixel resolution needed to generate good quality images at the center of the screen dictates the resolution used to render all the pixels in the window space. However, the image quality at the periphery is not required to be as high as the quality at the center of the screen because the subtended angle of view maps to more than one pixel. For example, higher resolution rendering is necessary to generate images in a high-acuity region that surrounds the central gaze direction (or the center of the lens of an HMD display device) but is not necessary to generate images of sufficient quality in lower-acuity regions in the visual periphery or in the peripheral regions of a lens. The high-acuity region typically includes a portion of the field-of-view that is within some angular distance of the central gaze direction. The angular distance from the central gaze direction is also referred to as the eccentricity. The lower-acuity regions include portions of the field-of-view that are at larger eccentricities. For example, the high-acuity region can include a portion of the field-of-view that is within an eccentricity of 5-10°, which corresponds to a portion of the field-of-view that projects to a retinal region in the human eye called the fovea.

The power and computing resources that are consumed to generate images for display by an HMD are reduced without compromising perceived image resolution by rendering pixels in window space with a non-uniform pixel spacing. In some embodiments, the non-uniform pixel spacing corresponds to an approximately constant pixel density per subtended angle across a user's field-of-view. For example, the pixel density per subtended angle is relatively high in a fovea region and relatively low on the visual periphery. A scan converter samples the pixels in window space through a first distortion function that maps the non-uniform pixels to uniformly spaced pixels in raster space. The scan converter renders display pixels based on values of the uniformly spaced pixels in raster space and the display pixels are passed through a second distortion function prior to display to the user.

Some embodiments of the first distortion function include a vertical distortion function that maps a first dimension of the non-uniform pixels to the uniformly spaced pixels and a horizontal distortion function that maps a second dimension of the non-uniform pixels to the uniformly spaced pixels. The first and second dimensions are orthogonal to each other. Some embodiments of the vertical and horizontal distortion functions are defined by corresponding sets of displacements from a linear function that maps uniformly spaced pixels in window space to uniformly spaced pixels in raster space. For example, the set of displacements for the vertical and horizontal distortion functions defines a set of points that are joined by a smooth curve that represents the first distortion function. Some embodiments of the vertical and horizontal distortion functions are modified to increase the resolution of pixels in a portion of the window space that corresponds to a location of a fovea region.

FIG. 1 is a block diagram of a graphics pipeline 100 that implements a DX12 application programming interface (API) according to some embodiments. The graphics pipeline 100 is capable of processing high-order geometry primitives to generate rasterized images of three-dimensional (3-D) scenes at a predetermined resolution. The graphics pipeline 100 has access to storage resources 101 such as a hierarchy of one or more memories or caches that are used to implement buffers and store vertex data, texture data, and the like. Some embodiments of shaders in the graphics pipeline 100 implement single-instruction-multiple-data (SIMD) processing so that multiple vertices are processed concurrently. The graphics pipeline 100 therefore implements the concept of unified shader model so that the shaders included in the graphics pipeline 100 have the same execution platform on the shared SIMD compute units. The shaders are therefore implemented using a common set of resources including one or more processors. The common set of resources is referred to herein as the unified shader pool 104.

In a typical DX12 rendering pipeline, an input assembler 102 is configured to access information from the storage resources 101 that is used to define objects that represent portions of a model of a scene. A vertex shader 103, which, in some embodiments, is implemented in software, logically receives a single vertex of a primitive as input from the input assembler 102 and outputs a single vertex. A hull shader 105 operates on input high-order patches or control points that are used to define the input patches. The hull shader 105 outputs tessellation factors and other patch data.

Primitives generated by the hull shader 105 can optionally be provided to a tessellator 106. The tessellator 106 receives objects (such as patches) from the hull shader 105 and generates information identifying primitives corresponding to the input object, e.g., by tessellating the input objects based on tessellation factors provided to the tessellator 106 by the hull shader 105. Tessellation subdivides input higher-order primitives such as patches into a set of lower-order output primitives that represent finer levels of detail, e.g., as indicated by tessellation factors that specify the granularity of the primitives produced by the tessellation process.

A domain shader 107 inputs a domain location and (optionally) other patch data. The domain shader 107 operates on the provided information and generates a single vertex for output based on the input domain location and other information. A geometry shader 108 receives an input primitive and outputs up to four primitives that are generated by the geometry shader 108 based on the input primitive.

The primitives are then mapped from a view window that contains the scene to a grid of pixels that represent the image that will be displayed to a user, e.g., using a window-to-viewport transformation. The term "window space" refers to the pixels that are generated by the graphics pipeline 100 up to this point in the processing. As discussed herein, the pixels in window space that are generated by the graphics pipeline 100 are non-uniformly distributed and have a non-uniform spacing between the pixels. In some embodiments, the graphics pipeline 100 renders the pixels in window space such that a pixel density per subtended area is constant across a user's field of view. For example, the pixels in window space are rendered with a relatively high pixel density in a fovea region of a user wearing an HMD that implements the graphics pipeline 100. The pixels in window space are rendered with a relatively low pixel density in the visual periphery.

A distortion function 109 is used to transform the non-uniformly spaced pixels in window space to uniformly spaced pixels in a raster space used by a scan converter 110. Some embodiments of the distortion function 109 implement a vertical distortion function that maps a first dimension of the non-uniformly spaced pixels in window space to the uniformly spaced pixels in raster space and a horizontal distortion function that maps a second dimension of the non-uniformly spaced pixels in window space to the uniformly spaced pixels in raster space. The vertical and horizontal distortion functions are defined based on sets of displacements from a linear distortion function that maps uniformly spaced pixels in window space to uniformly spaced pixels in the raster space. the scan converter 110 samples pixels in window space through the distortion function 109 to generate uniformly spaced pixels in raster space.

A pixel shader 111 receives a pixel flow from the scan converter 110 and outputs zero or another pixel flow in response to the input pixel flow. An output merger block 112 performs blend, depth, stencil, or other operations on pixels received from the pixel shader 111.

Figure 2:
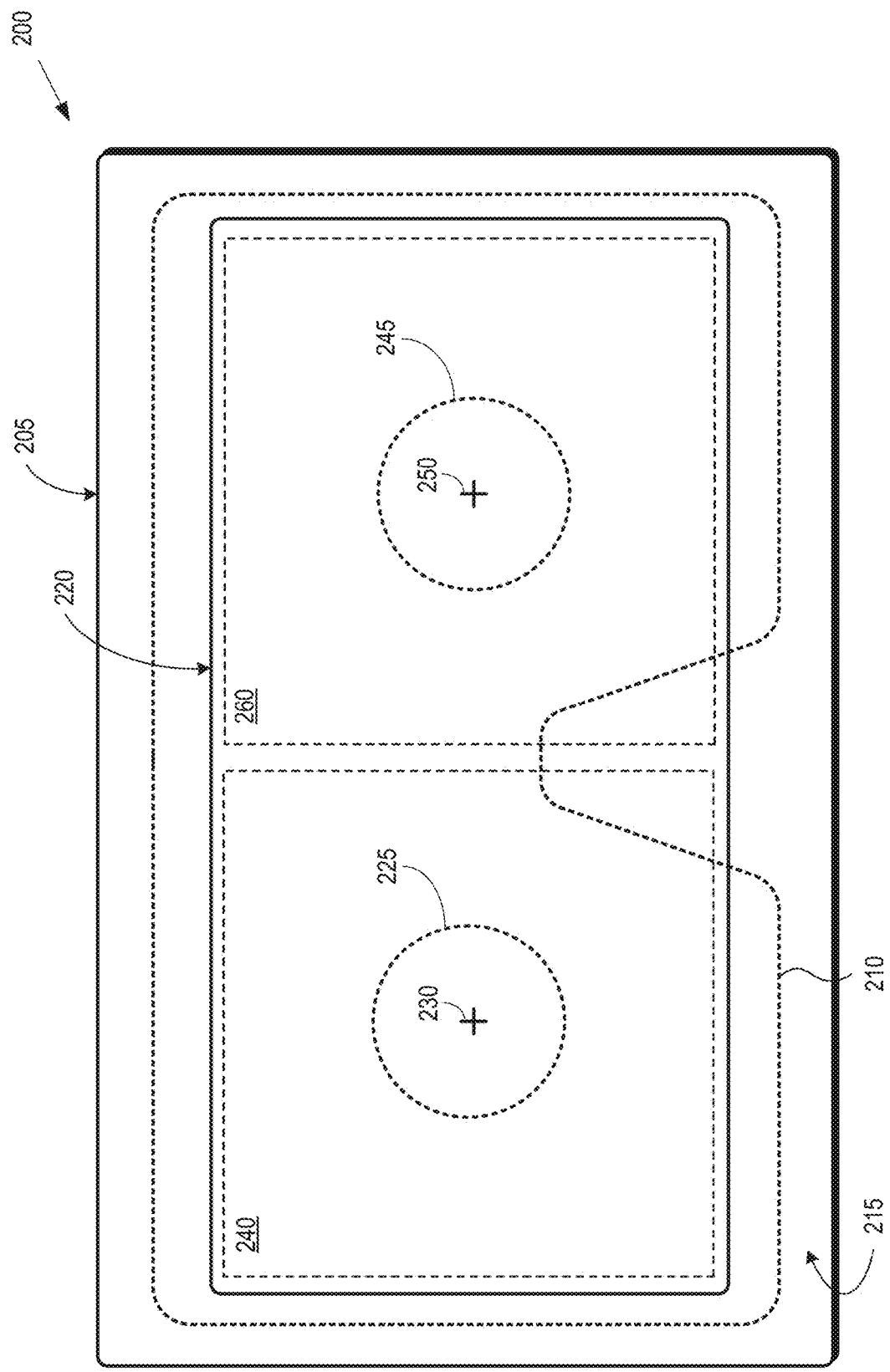
FIG. 2 illustrates a display system that includes an electronic device configured to provide immersive virtual reality (VR) or augmented reality (AR) functionality according to some embodiments.

FIG. 2 illustrates a display system 200 that includes an electronic device 205 configured to provide immersive VR or AR functionality according to some embodiments. The electronic device 205 is used to display images using values of pixels that are output from some embodiments of the graphics pipeline 100 shown in FIG. 1. A back plan view of an example implementation of the electronic device 205 in an HMD form factor in accordance with at least one embodiment of the present disclosure is shown in FIG. 2. In other embodiments, the electronic device 205 is implemented in other form factors, such as a form factor for glasses, a smart phone form factor, tablet form factor, a medical imaging device form factor, a standalone computer, a system-on-a-chip (SOC), and the like, which implement configurations analogous to those illustrated. As illustrated by the back plan view, the electronic device 205 can include a face gasket 210 mounted on a surface 215 for securing the electronic device 205 to the face of the user (along with the use of straps or a harness).

The electronic device 205 includes a display 220 that is used to generate images such as VR images or AR images that are provided to the user. The display 220 is divided into two substantially identical portions, a right portion to provide images to the right eye of the user and a left portion to provide images to the left eye of the user. In other embodiments, the display 220 is implemented as two different displays, one dedicated to each eye. The visual acuity of a user wearing the electronic device 205 depends on a distance from the user's center of gaze, e.g., the eccentricity. For example, the field-of-view for the user's left eye is subdivided into a high-acuity region 225 that surrounds a central gaze direction 230. The field-of-view for the user's left eye also includes a low-acuity region 240 in the visual periphery. Similarly, the field-of-view for the user's right eye is subdivided into a high-acuity region 245 that surrounds a central gaze direction 250 and a low-acuity region 260 in the visual periphery. The central gaze directions 230, 250 are set equal to the center of a current field-of-view or they are determined on the basis of eye tracking measurements that detect the central gaze direction of the user's eyes.

As discussed herein, a distortion function such as the distortion function 109 shown in FIG. 1 is used to map non-uniformly rendered pixels in window space to uniformly rendered pixels in raster space. A graphics pipeline that implements the distortion function is therefore able to render pixels in window space at relatively high resolution within the high-acuity regions 225, 245, e.g., by rendering the pixels at a resolution that is equal to the native resolution supported by the display. The graphics pipeline renders the pixels in window space within the low-acuity regions 240, 260 at lower resolutions, thereby reducing the power and computing resources needed to render the pixels in window space. The rendered pixels in window space are subsequently sampled by a scan converter through the distortion function to determine values of uniformly spaced pixels in raster space.

Figure 3:
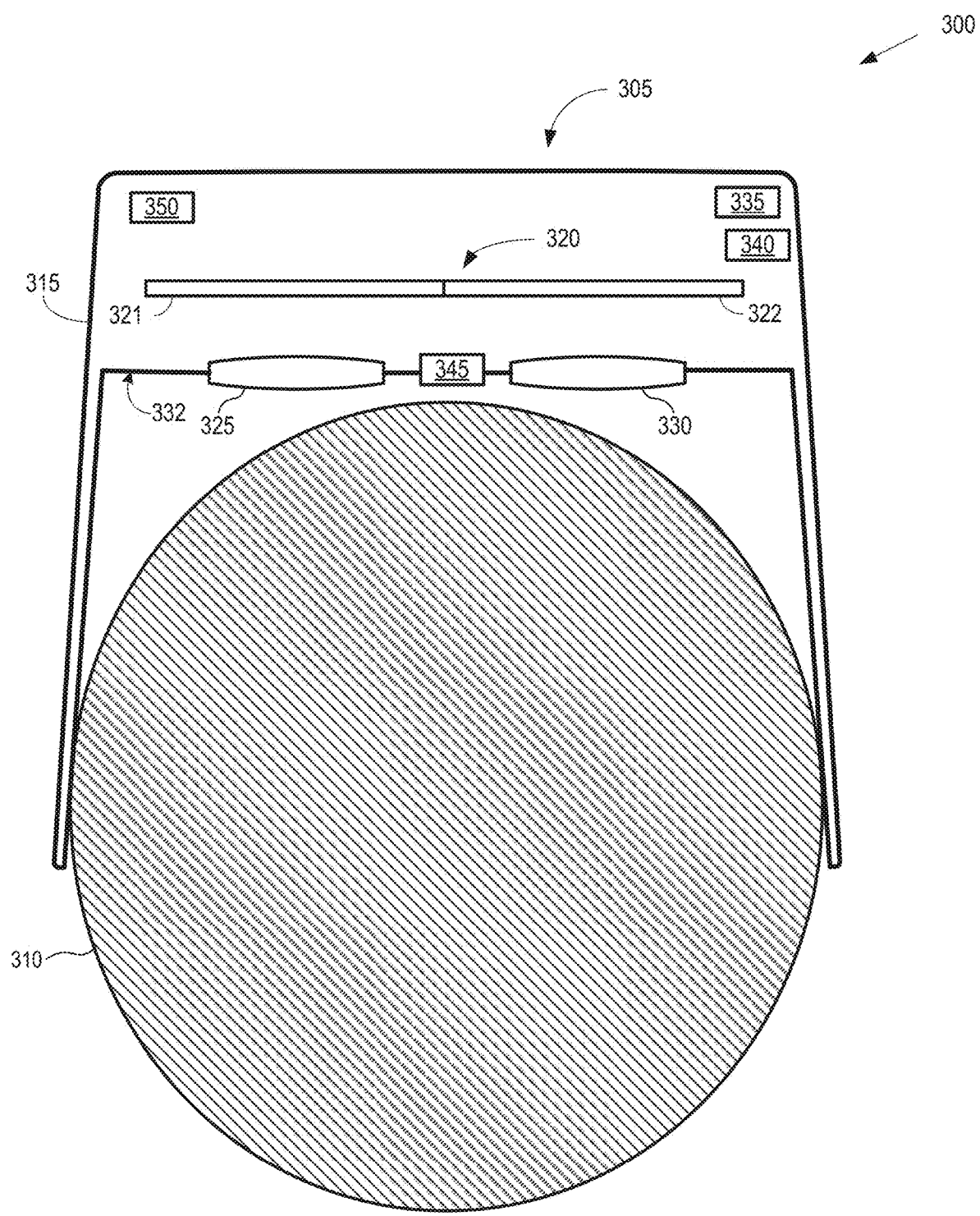
FIG. 3 illustrates a display system that includes an electronic device configured to provide AR or VR functionality to a user wearing the electronic device via a display according to some embodiments.

FIG. 3 illustrates a display system 300 that includes an electronic device 305 configured to provide AR or VR functionality to a user wearing the electronic device 305 via a display according to some embodiments. The electronic device 305 is used to implement some embodiments of the electronic device 205 shown in FIG. 2. The electronic device 305 is shown in FIG. 3 as being mounted on a head 310 of a user. As illustrated, the electronic device 305 includes a housing 315 that includes a display 320 that generates an image for presentation to the user. The display 320 is implemented using some embodiments of the display 220 shown in FIG. 2. In the illustrated embodiment, the display 320 is formed of a left display 321 and a right display 322 that are used to display stereoscopic images to corresponding left eye and right eye. However, in other embodiments, the display 320 is a single monolithic display 320 that generates separate stereoscopic images for display to the left and right eyes. The electronic device 305 also includes eyepiece lenses 325 and 330 disposed in corresponding apertures or other openings in a user-facing surface 332 of the housing 315. The display 320 is disposed distal to the eyepiece lenses 325 and 330 within the housing 315. The eyepiece lens 325 is aligned with the left eye display 321 and the eyepiece lens 330 is aligned with the right eye display 322.

In a stereoscopic display mode, imagery is displayed by the left eye display 321 and viewed by the user's left eye via the eyepiece lens 325. Imagery is concurrently displayed by the right eye display 322 and viewed by the user's right eye via the eyepiece lens 325. The imagery viewed by the left and right eyes is configured to create a stereoscopic view for the user. Some embodiments of the displays 320, 321, 322 are fabricated to include a bezel (not shown in FIG. 3) that encompasses outer edges of the displays 320, 321, 322. In that case, the lenses 325, 330 or other optical devices are used to combine the images produced by the displays 320, 321, 322 so that bezels around the displays 320, 321, 322 are not seen by the user. Instead, lenses 325, 330 merge the images to appear continuous across boundaries between the displays 320, 321, 322.

Some or all of the electronic components that control and support the operation of the display 320 and other components of the electronic device 305 are implemented within the housing 315. Some embodiments of the electronic device 305 include a processing unit such as a processor 335 and a memory 340 (or other hardware, firmware, or software) that can be used to implement some or all of a graphics pipeline such as the graphics pipeline 100 shown in FIG. 1. In some embodiments the workload associated with acquiring actual or virtual images and rendering these images for display on the display 320 can be shared with external processing units that are implemented outside of the electronic device 305. Some embodiments of the electronic device 305 include an eye tracker 345 to track movement of the user's eyes and determine a center of gaze for each eye in real-time. The electronic device 305 also includes one or more motion sensors 350. Examples of motion sensors 350 include accelerometers, gyroscopic orientation detectors, or other devices capable of detecting motion of the electronic device 305.

Figure 4:
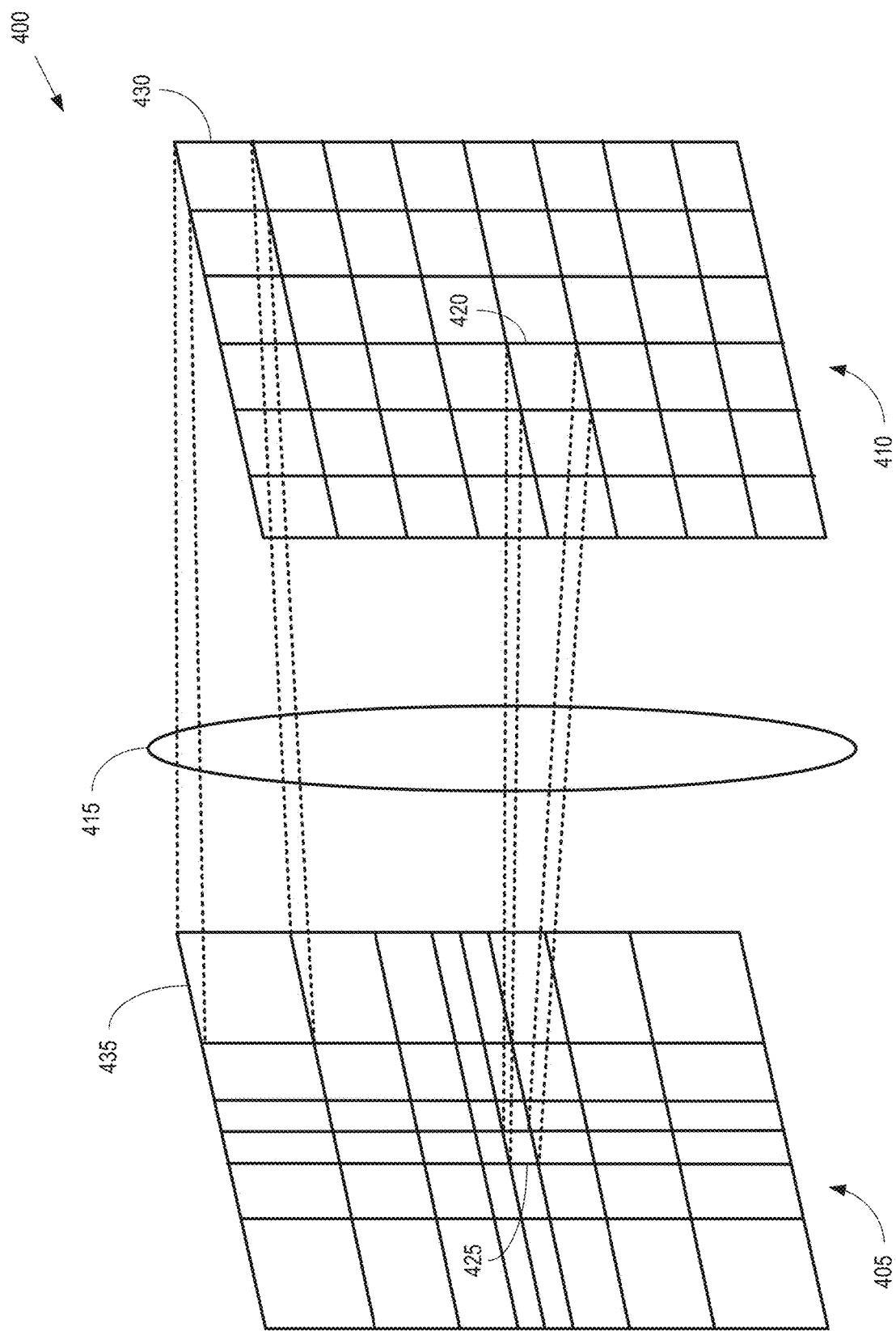
FIG. 4 illustrates a mapping of non-uniformly spaced pixels in a window space to uniformly spaced pixels in a raster space according to some embodiments.

FIG. 4 illustrates a mapping 400 of non-uniformly spaced pixels in a window space 405 to uniformly spaced pixels in a raster space 410 according to some embodiments. The mapping 400 is implemented in some embodiments of the graphics pipeline 100 shown in FIG. 1, the electronic device 205 shown in FIG. 2, and the electronic device 305 shown in FIG. 3. The pixels in the window space 405 are generated by a geometry portion of the graphics pipeline and a scan converter (or rasterizer) determines values of the pixels in the raster space 410 by sampling the pixels in the window space 405 through a distortion function 415, which is used to implement some embodiments of the distortion function 109 shown in FIG. 1.

The non-uniformly spaced pixels are distributed throughout the window space 405 according to the distortion function 415. In the illustrated embodiment, the distortion function 415 is implemented using a vertical distortion function and a horizontal distortion function. Horizontal boundaries of the pixels in the window space 405 are separated by decreasing distances moving from the top of the window space 405 to the middle of the window space 405, and are then separated by increasing distances moving from the middle of the window space 405 to the bottom of the window space 405. Vertical boundaries of the pixels in the window space 405 are separated by decreasing distances moving from the left side of the window space 405 to the middle of the window space 405 and are then separated by increasing distances moving from the middle of the window space 405 to the right side of the window space 405. Thus, the highest resolution pixels are near the center of the window space 405 and the lowest resolution pixels are near the edges of the window space 405.

The non-uniformly spaced pixels in the window space 405 are mapped to the uniformly spaced pixels in the raster space 410 by the distortion function 415. For example, the pixel 420 in the raster space 410 is mapped to the pixel 425 in the window space 405. The scan converter therefore performs relatively dense sampling of the rendered pixel 425 to determine values of the pixel 420. For another example, the pixel 430 in the raster space 410 is mapped to the pixel 435 in the window space 405. The scan converter therefore performs relatively sparse sampling of the rendered pixel 435 to determine values of the pixel 430.

The distortion function 415 is therefore able to adjust the sampling density of rasterization in a programmable way, which is used to reduce unnecessary pixel shading for applications such as VR and AR implemented in an HMD. Some embodiments of the distortion function 415 are implemented as a state-controlled 2D spatial distortion transformation that is disposed between a post-viewport transformed geometry window space (the window space 405) and the scan converter view of the geometry being rendered, e.g., in the raster space 410. In the illustrated embodiment, horizontal and vertical distortion curves compensate for static characteristics of the optics of the HMD and dynamic characteristics such as the changing gaze of the user that is wearing the HMD. The distortion function 415 also supports a dynamic trade-off of image quality versus performance on a frame-by-frame basis. The trade-off is performed by changing the size of a viewport window, a window associated with the distortion function 415, and a post-processing sample window without changing the distortion function 415. Rendered geometry can also be flexibly mapped to portions of a selected render target using the distortion function 415.

Figure 5:
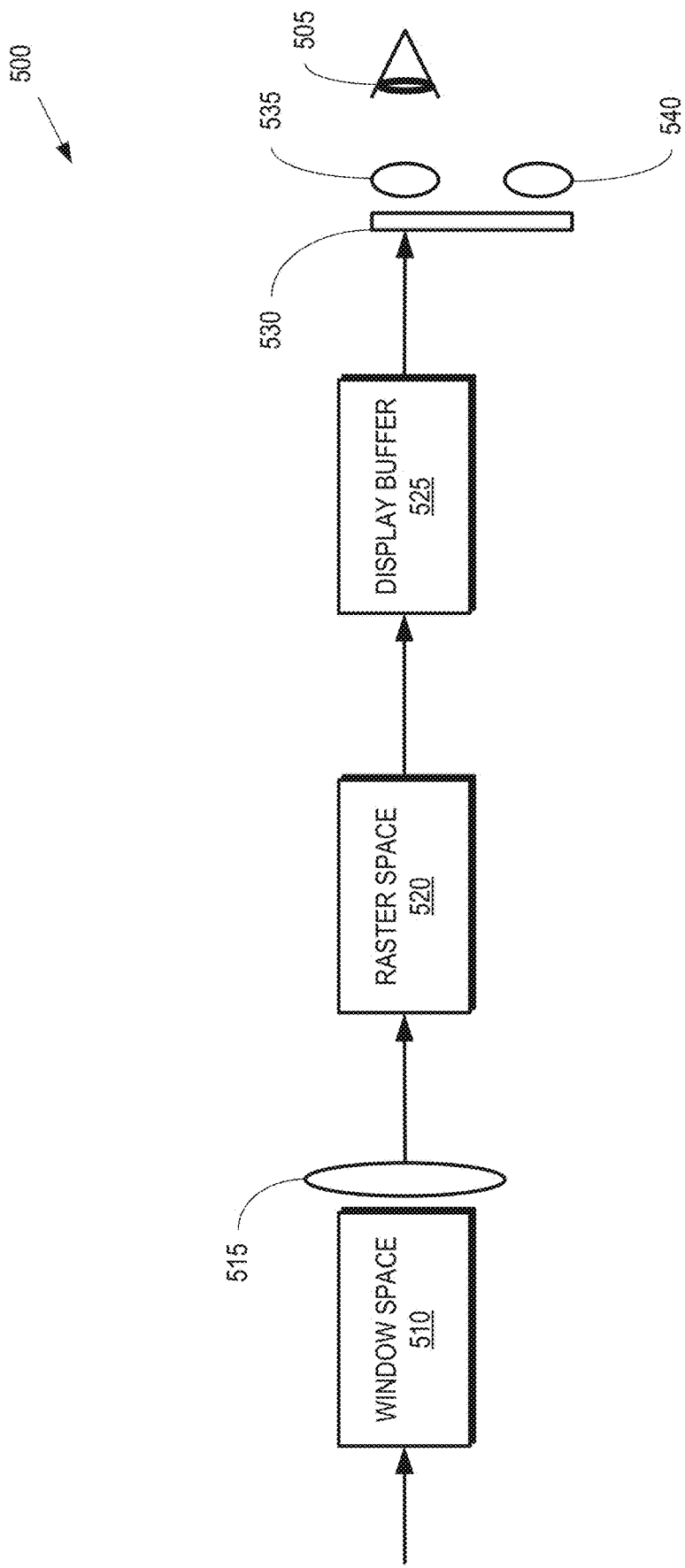
FIG. 5 is a block diagram illustrating a process of rendering of display pixels for display to an eye of the user wearing an HMD according to some embodiments.

FIG. 5 is a block diagram illustrating a process 500 of rendering of display pixels for display to an eye 505 of the user wearing an HMD according to some embodiments. The process 500 is implemented in some embodiments of the graphics pipeline 100 shown in FIG. 1, the electronic device 205 shown in FIG. 2, and the electronic device 305 shown in FIG. 3.

A geometry pipeline provides rendered pixels in window space 510. The field-of-view of the window space 510 is determined by a projection matrix and optical characteristics of the HMD. As discussed herein, the pixels in the window space 510 are rendered non-uniformly in accordance with a distortion function 515 such as the distortion function 109 shown in FIG. 1 and the distortion function 415 shown in FIG. 4. Some embodiments of the distortion function 515 are implemented in hardware, firmware, software, or a combination thereof. The distortion function 515 is configurable based on register values, as discussed below. The pixels in the window space 510 are distributed to establish near constant pixel density per subtended angle across the field-of-view of the user wearing the HMD.

A scan converter samples the non-uniform pixels in the window space 510 through the distortion function 515 to generate values of uniformly spaced pixels in the raster space 520. In some embodiments, postprocessing is performed in the raster space 520 by distortion-aware shaders and other filters. The values of the pixels in the raster space 520 are then used to generate values of display pixels that are provided to a display buffer 525. In some embodiments, the rendered or reconstructed image is sampled from the raster space 520 with a modified mesh to perform chromatic adjustments or other filtering.

Display pixels stored in the display buffer 525 are provided to a display 530 implemented in the HMD. The display 530 uses the values of the display pixels to generate images that are presented to the eye 505 using one of a corresponding pair of lenses 535, 540. Implementing the distortion function 515 to support rendering of non-uniformly spaced pixels in the window space 510 therefore reduces the resources consumed in the geometry pipeline to render pixels in the visual periphery at an excessively high resolution, which enables higher quality rendering at lower resolutions. The scan converter performs nearly 1:1 sampling of the pixels in the window space 510 to render the pixels in the raster space 520. A dynamic trade-off between quality and performance is achieved by changing the resolution of the window space 510 and the raster space 520.

A geometric transformation between a 2D post viewport window space (such as the window space 510) and a 2D raster view (such as the raster space 520) uniquely and bi-directionally maps any X, Y point in the raster space to a distorted x,y the window space. An example of the mapping is given by:

$$(x,y)_{ws}=F[(X,Y)_{rs}] \text{ and } (X,Y)_{rs}=F'[(x,y)_{ws}]$$

where ws refers to the window space, rs refers to the raster space, and F( ) and F'( ) define the spatial transformation between the two 2D images. Some embodiments represent the distortion function as a vertical distortion function and a horizontal distortion function. For example, the distortion in the horizontal and vertical components is represented as:

$$(x)_{ws}=F_x[(X)_{rs}] \text{ and } (X)_{rs}=F'_x[(x)_{ws}] \&$$

$$(y)_{ws}=F_y[(Y)_{rs}] \text{ and } (Y)_{rs}=F'_y[(y)_{ws}]$$

State tables and logic are used to construct $F_x$, $F'_x$, $F_y$, $F'_y$ for sampling the distortion maps used for each primitive.

The state parameters for a horizontal and vertical directions of each eye and each pipe are listed in the table below. The state defining the distortion curves is stored as configuration state. The enabling state and the state for cooperating with binning is referred to as "render state."

In some embodiments, a control method for defining the distortion function includes defining a window, e.g., using the upper left and lower right coordinates of the window in the window space 510. Values of the state parameters for the horizontal and vertical directions are accessed from a set of lookup tables (LUTs). For example, the system can implement one LUT for each combination of two graphics pipelines, two eyes, and two directions (horizontal and vertical) for a total of eight LUTs. As discussed in detail below, LUT defines an eight region curve with an alpha controlled RCP curve between points used to generate the actual horizontal and vertical distortion curve. Register state values are used to control the distortion process during primitive rasterization.

| Name | Bits | Description |
| --- | --- | --- |
| TABLE[n].Window[m].TopLeftX | 15 | Screen x coordinate for the start of the table. |
| TABLE[n].Window[m].TopLeftY | 15 | Screen y coordinate for the start of the table. |
| TABLE[n].Window[m].BottomRightX | 15 | Screen x coordinate for the end of the table. |
| TABLE[n].Window[m].BottomRightY | 15 | Screen y coordinate for the end of the table. |
| TABLE[n].RcpData[m].dir[2].YPosition[7] | 8 | YPosition deltas from center diagonal 8b 2comp |
| TABLE[n].RcpData[m].dir[2].YPositionShift | 4 | Common exponent for yposition deltas |
| TABLE[n].RcpData[m].dir[2].XPosition[7] | 8 | XPosition deltas from center diagonal 8b 2comp |
| TABLE[n].RcpData[m].dir[2].XPositionShift | 4 | Common exponent for xposition deltas |
| TABLE[n].RcpData[m].dir[2].Alpha[8] | 8 | Alphas, in 1.7 signed magnitude |
| RenderState[state_id].FbwRecursionsX | 3 | FBW recursion control for X |
| RenderState[state_id].FbwRecursionsY | 3 | FBW recursion control for Y |
| RenderState[state_id].FSR_EN[MAX_VIEWS] | 16 | Bit per viewport - use FSR distortion |
| RenderState[state_id].OR_RED_FSR_EN | 1 | logical OR reduction of all viewports FSR_EN |

Figure 6:
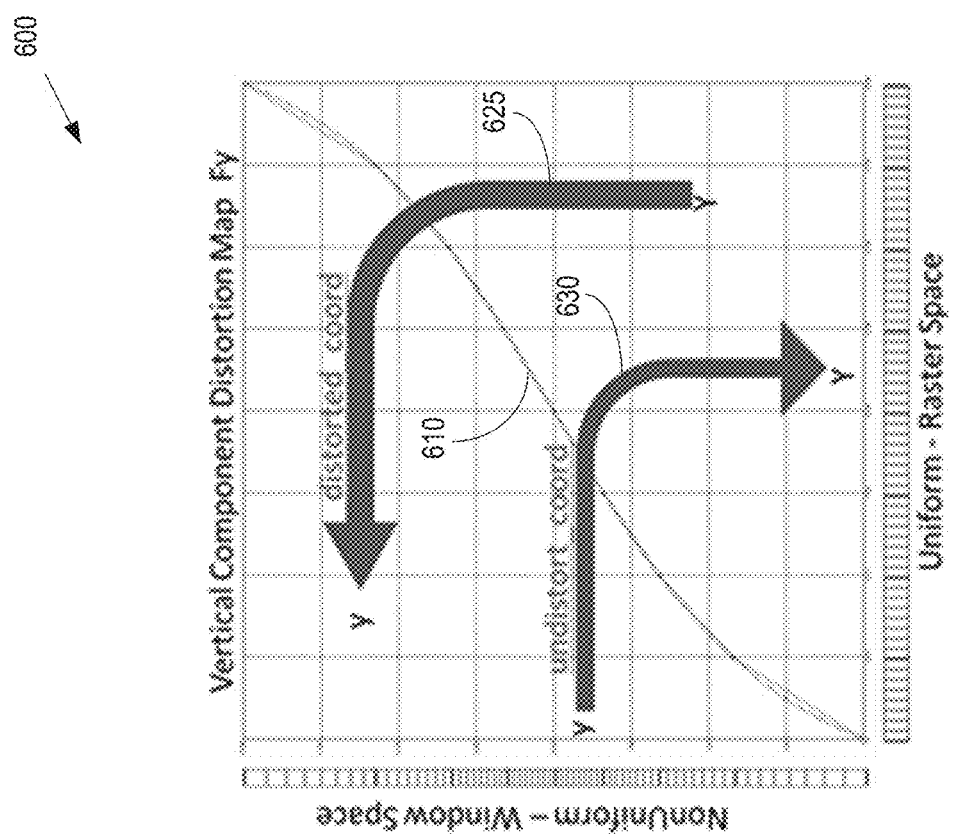
FIG. 6 is a set of plots that represent a horizontal distortion function and a vertical distortion function that are used to implement a distortion function according to some embodiments.
Figure 6:
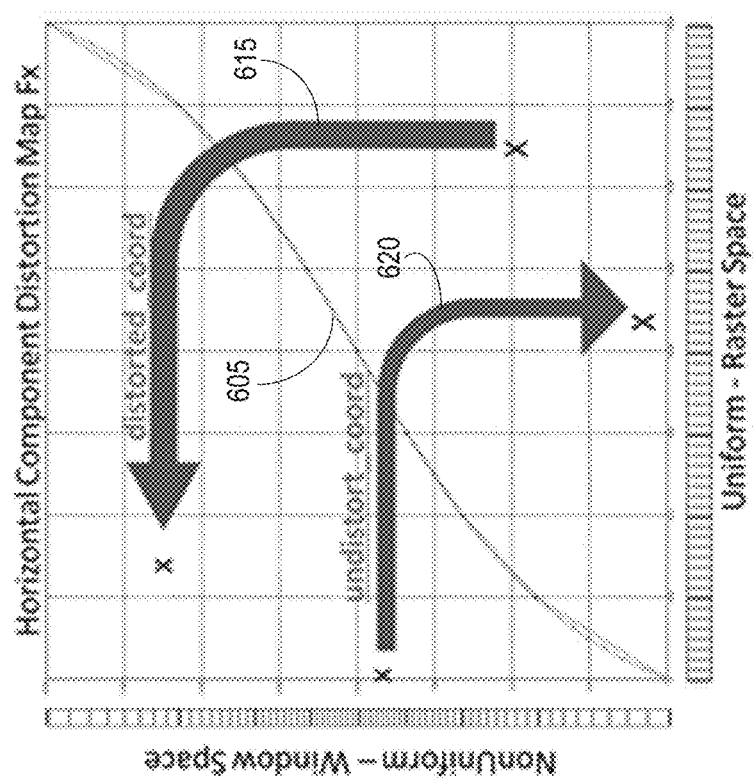

FIG. 6 is a set 600 of plots that represent a horizontal distortion function 605 and a vertical distortion function 610 that are used to implement a distortion function according to some embodiments. The horizontal distortion function 605 and the vertical distortion function 610 are implemented in some embodiments of the distortion function 109 shown in FIG. 1, the electronic device 205 shown in FIG. 2, the electronic device 305 shown in FIG. 3, the distortion function 415 shown in FIG. 4, and the distortion function 515 shown in FIG. 5. The horizontal distortion function 605 and the vertical distortion function 610 are implemented in hardware that is configurable on the basis of state information stored in one or more registers.

For each eye, state data defines the horizontal distortion function 605 and the vertical distortion function 610 to map coordinates X, Y in a raster space to coordinates x,y in a window space. In some embodiments, the optical center in the vertical direction and the horizontal direction is determined based on the HMD manufacturer specification or application programming interface (API). The distortion function is typically a 2D function and can be queried from the HMD driver via an API. The optical center corresponds to the location where the distance between two pixels sampled in the render target is the smallest. Once the center is found, at the vertical center, a curve representing the horizontal distortion function 605 is extracted, and at the horizontal center, a curve representing the vertical distortion function 610 is extracted. Once a distortion curve has been established, the system determines the parameters of an eight segment smooth piecewise function that is used to represent the horizontal distortion function 605 and the vertical distortion function 610 in hardware.

The horizontal distortion function 605 and the vertical distortion function 610 are used to distort an image or undistort an image, as indicated by the arrows 615, 620, 625, 630.

Figure 7:
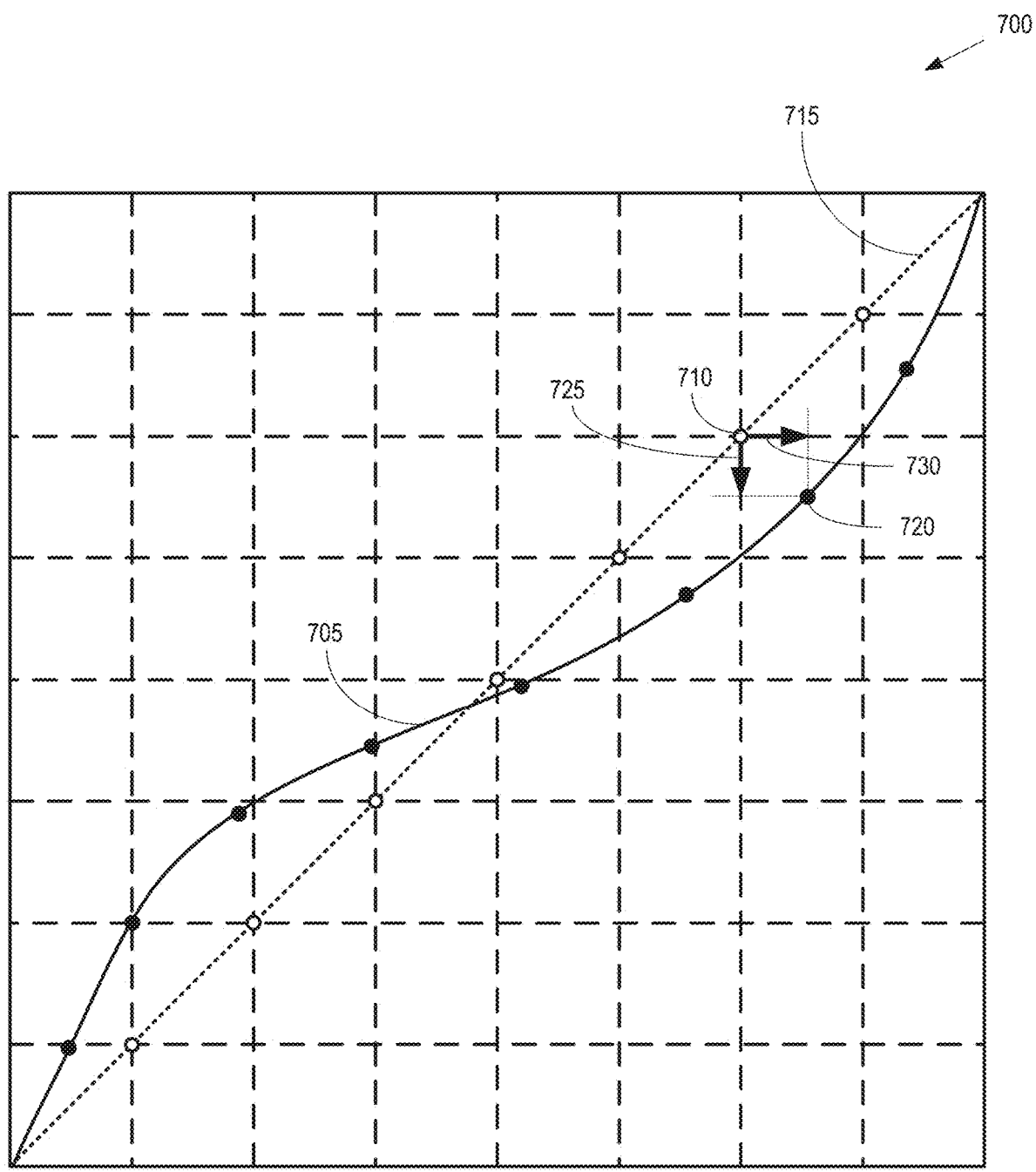
FIG. 7 is an illustration of a distortion curve that represents a horizontal distortion function or a vertical distortion function according to some embodiments.

FIG. 7 is an illustration 700 of a distortion curve 705 that represents a horizontal distortion function or a vertical distortion function according to some embodiments. The distortion curve 705 implemented in some embodiments of the distortion function 109 shown in FIG. 1, the electronic device 205 shown in FIG. 2, the electronic device 305 shown in FIG. 3, the distortion function 415 shown in FIG. 4, and the distortion function 515 shown in FIG. 5. The distortion curve 705 is implemented in hardware that is configurable on the basis of state information stored in one or more registers. The distortion curve 705 illustrates an example of a representation of a distortion curve that is used to map coordinates from window space to raster space. However, other embodiments of distortion curves are represented using other parameterizations or functional representations of the window-to-raster space mapping.

The distortion curve 705 represents a mapping of one coordinate from window space to raster space. The window space coordinate is represented on the vertical axis and the raster space coordinate is represented on the horizontal axis. If the distortion curve 705 represents the mapping of an X coordinate, then the distortion curve 705 represents a horizontal distortion function. If the distortion curve represents the mapping of a Y coordinate, then the distortion curve 705 represents a vertical distortion function. In the interest of clarity, the following discussion assumes that the distortion curve 705 represents a horizontal distortion function that maps the X coordinate from the window space to the raster space. If the distortion curve 705 is mapped to position points 710 (only one indicated by a reference numeral in the interest of clarity) on a diagonal line 715, there is no distortion and an x of window space is equal to an X in raster space.

In the illustrated embodiment, positioning of points 720 (only one indicated by a reference numeral in the interest of clarity) on the distortion curve 705 are controlled by state data: YPosition, YPositionShift, XPosition, XPositionShift. The position values that represent the locations of the points 720 are stored as horizontal and vertical deltas from seven equally spaced points 710 on the diagonal 715 of the distortion table after a common PositionShift has been applied. However, as discussed above, some embodiments of the distortion curve 705 are represented by different numbers of points, which are not necessarily equally spaced. Furthermore, continuous functions or piecewise continuous functions such as splines, polynomials, or other parametric curves are used to identify the locations of the points 720 in some embodiments.

The PositionShift values are determined by finding the exponent of the next power of two value that contain the largest position difference from the diagonal. The position values increase both horizontally and vertically, as the function used for the distortion is monotonically increasing. For example, the coordinates of the point 710 are determined by corresponding values of XPosition and YPosition. The location of the point 720 on the distortion curve 705 is then determined relative to the point 710 by the values YPositionShift and XPositionShift, which are indicated by the arrows 725, 730, respectively. The alpha values are then used to modify the curvature of the curve between the nearest X,Y positions so the curve passes thru the desired location of the point 720. Once the locations of the points 720 are determined, a set of piecewise curves (using alpha values) is selected to create a smooth distortion curve 705.

Figure 8:
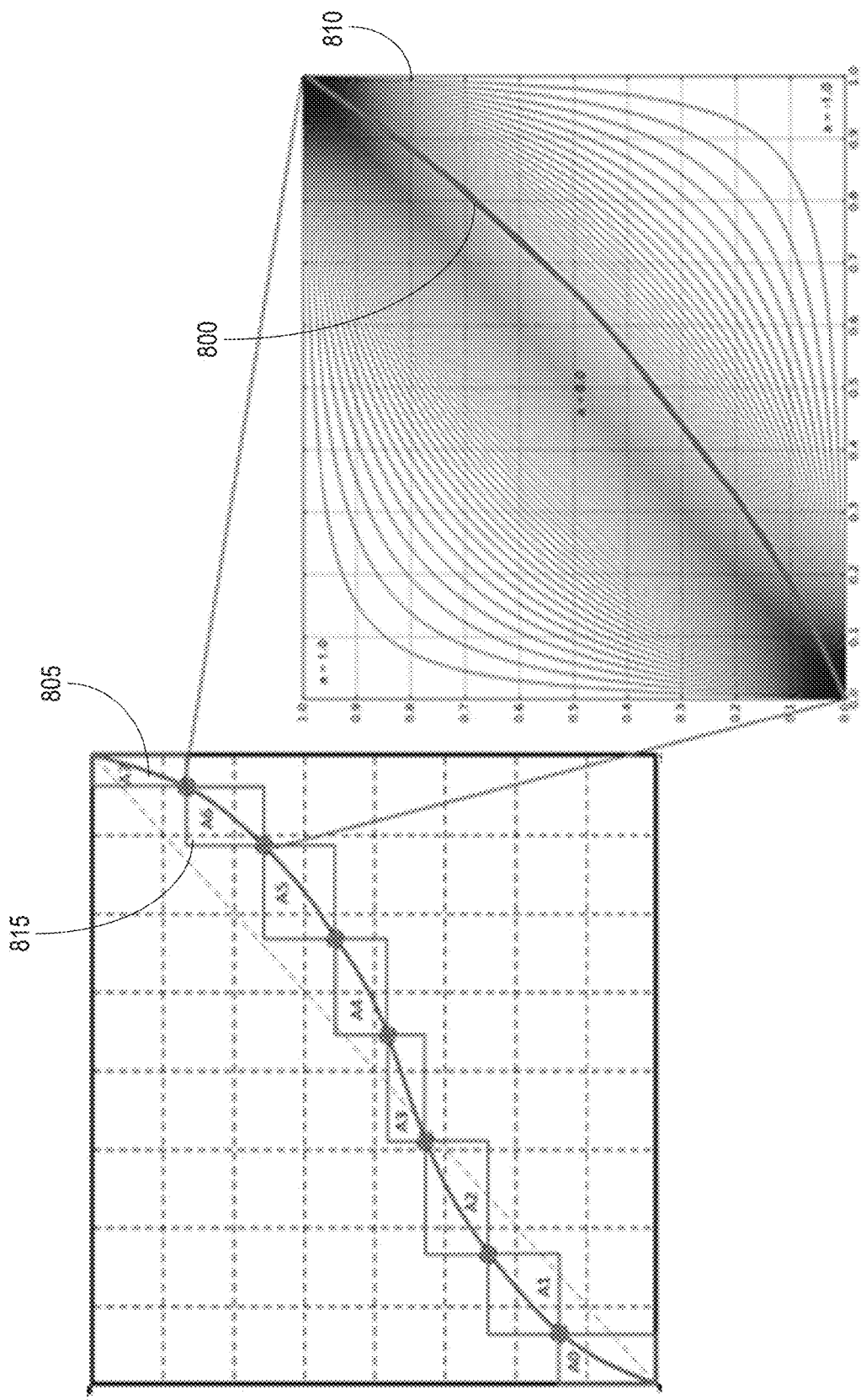
FIG. 8 illustrates selection of a piecewise curve that is used to form a smooth distortion curve according to some embodiments.

FIG. 8 illustrates selection of a piecewise curve 800 that is used to form a smooth distortion curve 805 according to some embodiments. The distortion curve 805 represents some embodiments of the distortion curve 705 shown in FIG. 7. In the illustrated embodiment, a set of points that determines the distortion curve 805 have been configured, e.g., on the basis of positions of points on a diagonal line and corresponding offsets. The plot 810 illustrates a set of candidate piecewise curves that are available to be selected as the piecewise curve 800 that is used to form the smooth distortion curve 805 in the section identified by the bounding box 815. In the illustrated embodiment, the piecewise curve 800 has been selected from the set of candidate piecewise curves.

Shapes of the candidate piecewise curves are determined by alpha values that define how the curve travels from the bottom left corner of the bounding box 815 to the top right corner of the bounding box 815. The selection of a position value placement uses a search space to find the best set of piecewise curves that create a smooth distortion curve 805 to encapsulate the actual optics curve and the diagonal to prevent under-sampling. In one embodiment, points are placed with equal horizontal separation and then potential vertical positions and alpha values are searched, followed by a shift in horizontal spacing and adjustment to other values to find the best curve match. The alpha value that represents the piecewise curve 800 is selected using a sampling method. For example, the distortion curve 805 is sampled at a midpoint of the segment and the alpha value is determined based on based on the x coordinate value (in window space) at the sampled point of the distortion curve 805. For another example, multiple points on the distortion curve 805 are sampled and the alpha value is determined based on an average of the x coordinate values. For yet another example, multiple points on the distortion curve 805 are sampled and the alpha value with the smallest squared error sum relative to the sampled x coordinate values is selected.

Figure 9:
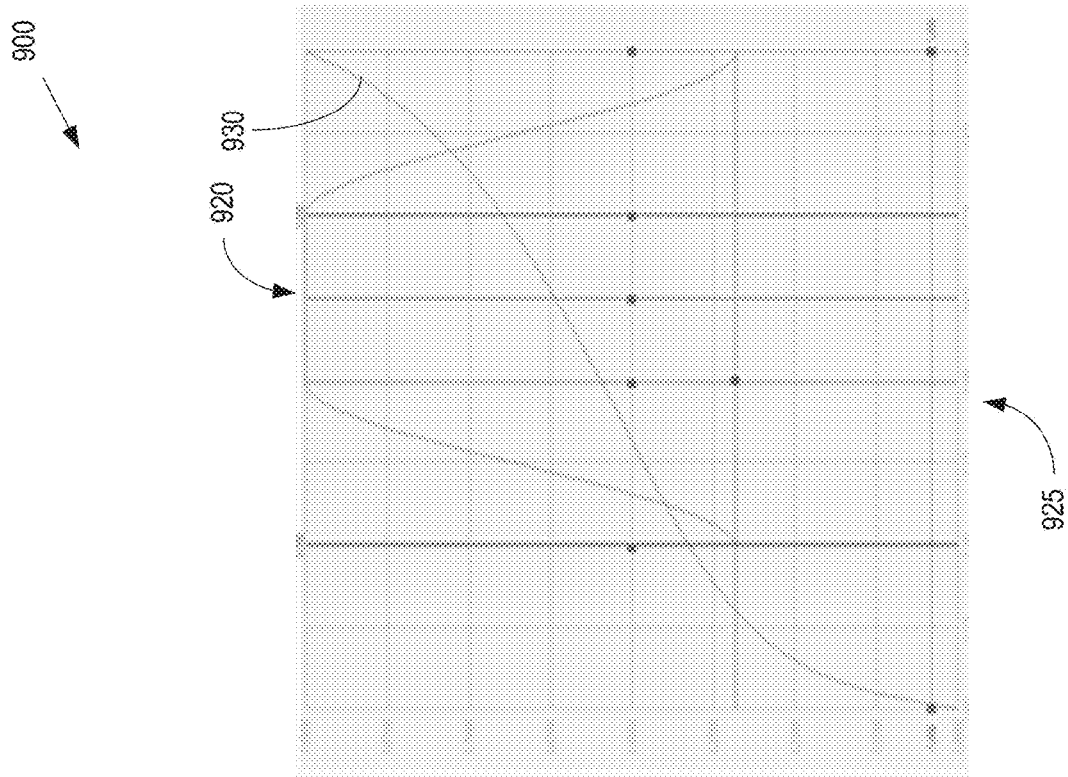
FIG. 9 is a set of plots that illustrates a fovea modification of a distortion curve according to some embodiments
Figure 9:
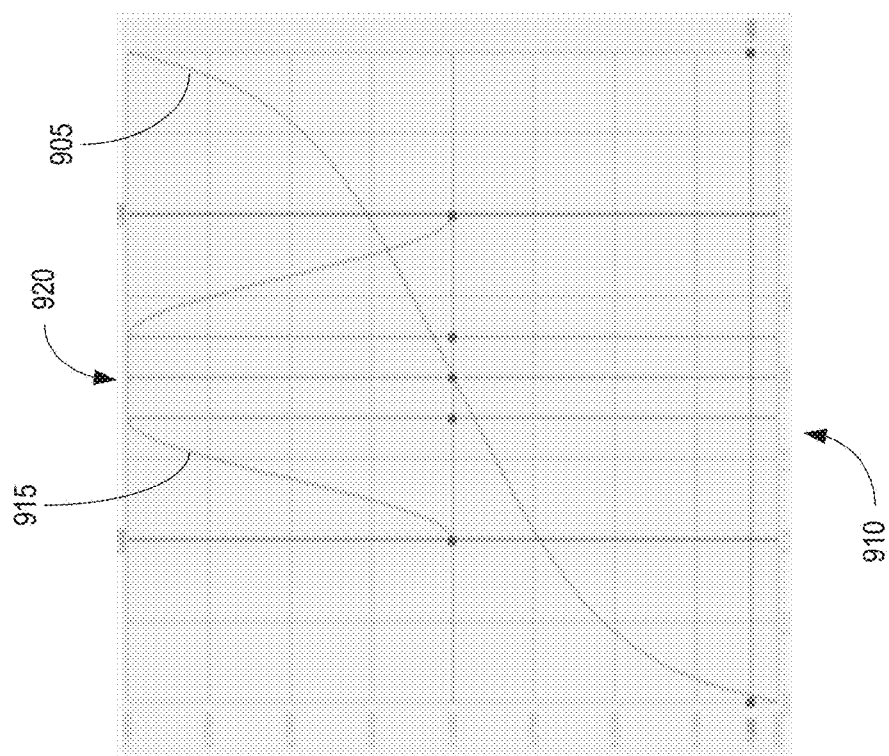

FIG. 9 is a set 900 of plots that illustrates a fovea modification of a distortion curve 905 according to some embodiments. The graph 910 illustrates the distortion curve 905 and a fovea curve 915 that represents a central gaze direction 920 and a falloff in acuity with increasing eccentricity from the central gaze direction 920. The graph 925 illustrates a modified distortion curve 930 that increases resolution at an X, Y location corresponding to the central gaze direction 920 and within a corresponding bounding region. The modified distortion curve 930 is modulated with the fovea curve 915 to heighten the resolution with the prescribed falloff. In some embodiments, fovea modification of the distortion curve 905 does not increase the cost of pixel shading because the fovea modification increases spacing in the visual periphery by a corresponding amount to decrease packing inside the fovea region. In some cases, additional pixel rending is added for the fovea regions as well.

In some embodiments, state information indicating the boundaries of the window, e.g., coordinates of the bottom right and upper left of the window, are changed to adjust the number of pixels that are rendered. In that case, the width and height used by the viewport transform width/height, as well as state information indicating an offset, is changed by a percentage corresponding to a percentage change in the size of the window. Full screen viewport and mirror or window rendering in the viewport use the same percentage. The triangle/quad mesh or compute shader that samples buffers for each chromatic sample uses the same UV mesh since the coordinates are in the 0 to 1 range and only need to be scaled by the texture size.

Figure 10:
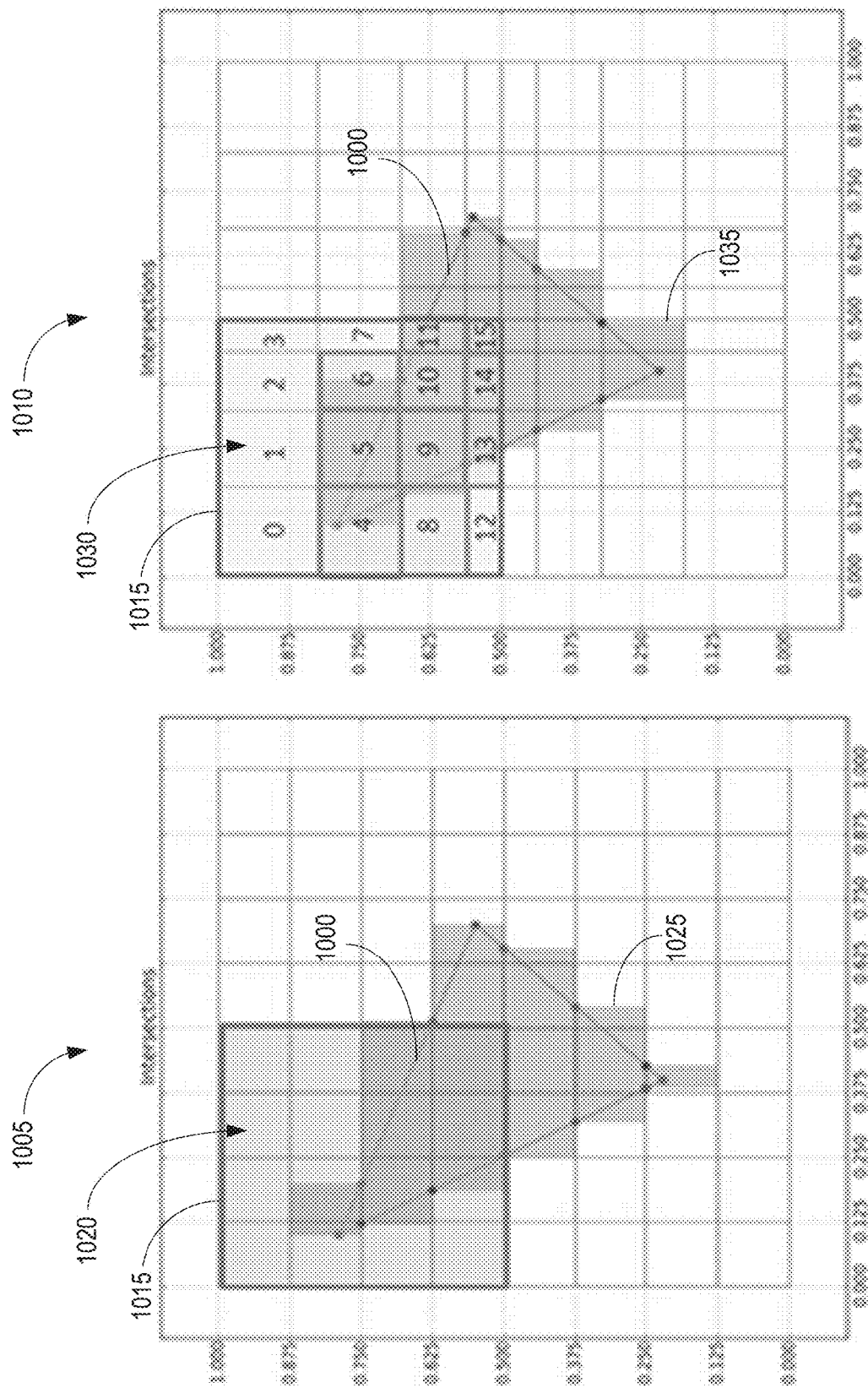
FIG. 10 illustrates binning of tiles that represent portions of a primitive in a raster space of uniformly spaced pixels and a window space of non-uniformly spaced pixels according to some embodiments.

FIG. 10 illustrates binning of tiles that represent portions of a primitive 1000 in a raster space 1005 of uniformly spaced pixels and a window space 1010 of non-uniformly spaced pixels according to some embodiments. Binning is performed in some embodiments of the graphics pipeline 100 shown in FIG. 1. In the illustrated embodiment, a bin 1015 is subdivided into multiple smaller bins. A minimum bin size for implementing distortion functions as disclosed herein is 32×32 in some cases because this size corresponds to the size of a rasterization tile in a scan converter such as the scan converter 110 shown in FIG. 1. However, the sizes, including the minimum bin size, are matters of design choice. Some embodiments of the graphics pipeline include a binner (such as a primitive batch binner or a draw stream binning rasterizer) that produces larger or smaller bins, e.g., down to 16×16, for depending on the target binning characteristics or other characteristics of the graphics processing system.

Binning in the uniform raster space 1005 uses intersections of the primitive 1000 with the uniform pixels 1020 (only one indicated by a reference numeral in the interest of clarity) in the bin 1015 to identify the sub-bins 1025 that are touched by the primitive 1000.

In the non-uniform window space 1010, an additional unit (referred to hereinafter as a flexible bin walker, FBW) is used to split larger bins and do queries for distorted bin boundaries at a destination resolution determined by a distortion function. For example, the bin 1015 is subdivided on the basis of the distorted pixels 1030 by identifying the sub-bins 1035 that are touched by the primitive 1000. The FBW is therefore able to produce distorted geometry at 32×32 resolution when the bin size is configured to be larger. In some embodiments, resolution can also be modified by combining multiple bins into a single distorted bin, which allows 32×32 warp granularity with 16×16 bin resolution. Some embodiments of the FBW are controlled via two signed 3-bit registers, separately for X and Y. Positive values indicate that the bin 1015 is to be split further for warping and negative values indicate that the bin 1015 is to be combined for larger warp bins. A maximum split count of three indicates that the bin 1015 is split to eight distorted bins. In practice this means that 256×256 bin size is the largest bin size that is able to be split to 32×32 warp bin size. As discussed above, the particular bin sizes discussed herein are illustrative and some embodiments implement larger or smaller bin sizes depending on characteristics of the graphics processing system.

When the FBW subdivides the larger bin 1015, an output is only created for each sub-bin 1025, 1035 that intersects with the primitive 1000. No clock cycles are consumed to maintain untouched sub-bins. Each sub-primitive output is appropriately distorted according to the distortion function by the scan converter. Some embodiments of the binner are limited to a maximum of 256×256 bin sizes in order to support unique output distortion on the basis of the distortion function for each 32×32 region. If the binner uses larger bin sizes, the effects of the distortion function are coarser grain. The binner, the FBW, and the scan converter operate in a uniform raster space, but inclusion of the distortion function provides a per-primitive/sub-primitive distorted window space view of the geometry as illustrated by the nonuniform window space 1010 shown in FIG. 10. For 256×256 bin sizes or smaller, the distortion function is applied on the geometry per 32×32 raster space region. The programmable eight segment LUT with alpha described above is used in both the binner and the FBW.

Figure 11:
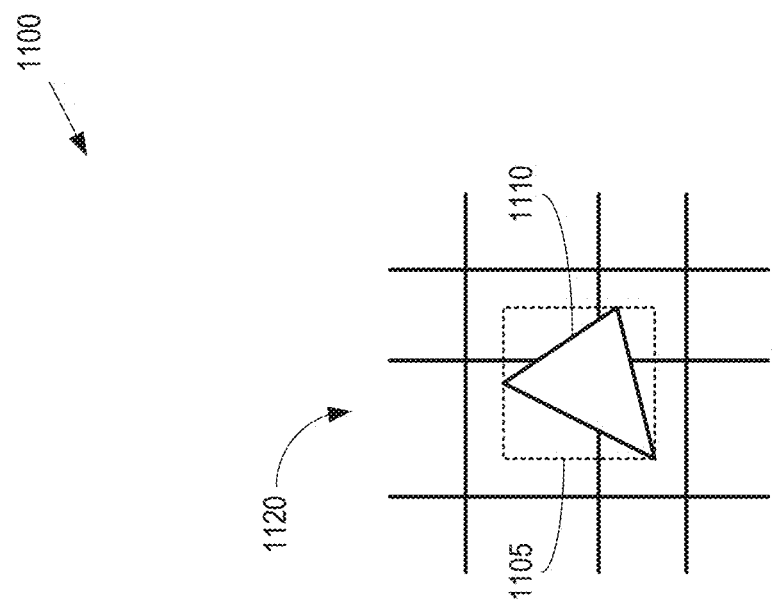
FIG. 11 illustrates distortion-aware routing of primitives based on a comparison of a primitive bounding box to a distorted raster view according to some embodiments.
Figure 11:
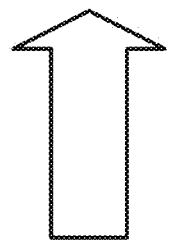
Figure 11:
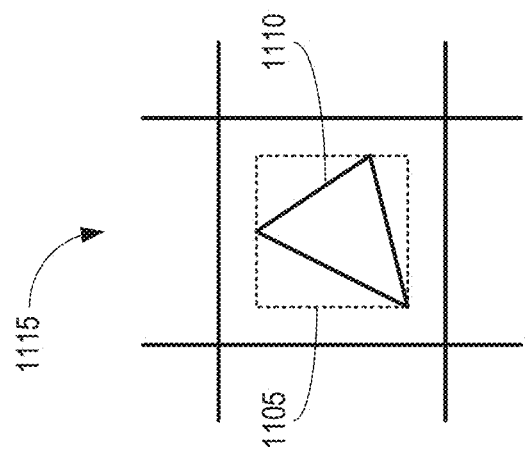

FIG. 11 illustrates distortion-aware routing 1100 of primitives based on a comparison of a primitive bounding box to a distorted raster view according to some embodiments. A primitive assembler such as the input assembler 102 shown in FIG. 1 uses a bounding box 1105 to route a primitive 1110 to the appropriate shader engines and scan converter for rasterization. However, the distortion function changes the mapping of the primitive 1110 to the uniformly spaced pixels in raster space. For example, in the undistorted raster space 1115, the bounding box 1105 is entirely within a single pixel that is routed to corresponding shader engines and a scan converter. However, in the distorted view 1120 of the raster space, the bounding box 1105 overlaps with four of the non-uniformly spaced pixels. Consequently, the primitive assembler makes different routing decisions to route the primitive 1110 to the appropriate shader engines and scan converters.

Some embodiments of the primitive assembler use an inverse of the distortion function to perform routing of the primitive 1110. For example, the inverse distort function is applied to four values (minx, miny, maxx, maxy) that define the boundaries of the bounding box 1105 to create the raster view of the primitive. In some embodiments, the following code fragment is used to generate the rasterizer/scan converter (SC) view of the bounding box.

```
//get rasterizer view of bounding box
  to determine SC(s) primitive routing def undistortBBox(x0,y0,x1,y1,x2,y2) :
    minx = self.undistort_coord(min(x0,x1,x2))
    miny = self.undistort_coord(min(y0,y1,y2))
    maxx = self.undistort_coord(max(x0,x1,x2))
    maxy = self.undistort_coord(max(y0,y1,y2))
    return (minx, miny, maxx, maxy)
```

Some embodiments of a binner/vertical rasterizer determine vertical bin rows using the same unwarping of the bounding box 1105 as the primitive assembler uses to select shader engines.

Figure 12:
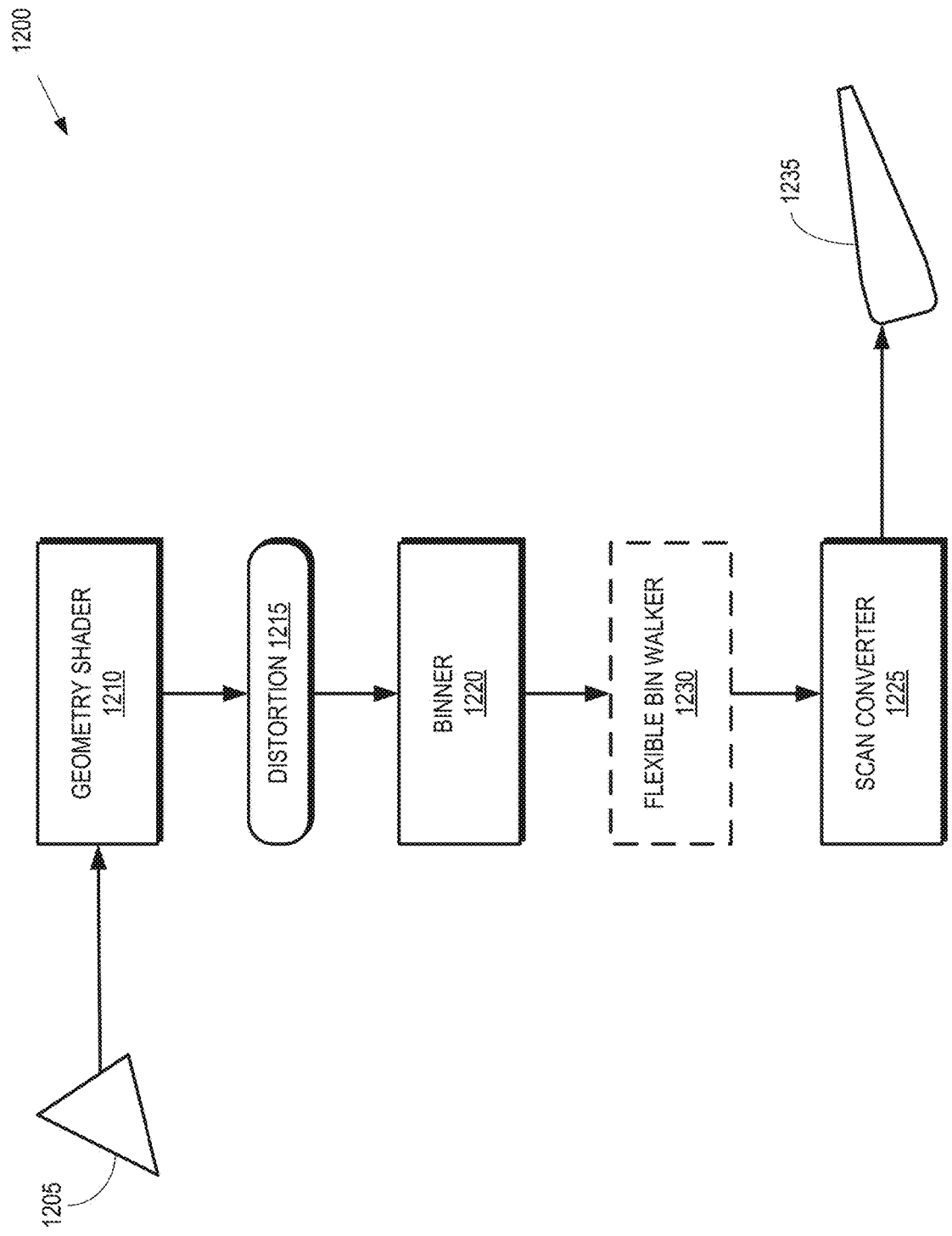
FIG. 12 is a block diagram of a portion of a graphics pipeline that illustrates binning of primitives according to some embodiments.

FIG. 12 is a block diagram of a portion 1200 of a graphics pipeline that illustrates binning of primitives according to some embodiments. The portion 1200 of the graphics pipeline is implemented in some embodiments of the graphics pipeline 100 shown in FIG. 1. In the illustrated embodiment, a primitive 1205 is provided to a geometry shader 1210 that performs rendering of non-uniformly spaced pixels in window space, as discussed herein. The geometry shader 1210 provides the rendered window space pixels to a distortion function 1215, which is implemented in hardware and is configurable on the basis of values of registers.

A binner 1220 receives a batch of primitives such as triangles from the geometry shader 1210 via the distortion function 1215. Some embodiments of the binner 1220 operate in two stages: vertical and horizontal. The vertical stage answers the question: "which triangles of the current batch touch a bin row Y". The horizontal stage answers the question: "which triangles of the bin row Y touch a bin X". The binner 1220 answers these questions for each bin that potentially is touched by any triangle of a batch. For each bin, the binner 1220 sends each triangle that touches the bin toward the scan converter 1225. The binner 1220 sets a scissor rectangle around the current bin so the scan converter 1225 only rasterizes within the current bin. In some cases, the triangle vertex positions are fixed point 24-bit XY coordinates. Thus, the binner 1220 presents a different view of geometry to the scan converter 1225 based on the distortion function 1215, such that each bin processed by the scan converter 1225 is able to process a unique resolution of the window to generate display pixels that are provided to a display device such as an HMD 1230.

Some embodiments of the portion 1200 of the geometry pipeline also include a flexible bin walker 1235 that operates in the manner discussed above. The flexible bin walker 1235 is an optional element that is not necessarily implemented in the portion 1200 of the geometry pipeline, as indicated by the dashed lines.

Some embodiments of the binner 1220 perform vertical and horizontal rasterization in accordance with vertical and horizontal distortion functions such as the vertical and horizontal distortion functions 605, 610 shown in FIG. 6. The vertical rasterizer in the binner 1220 calculates and stores vertical extents of each triangle. The resolution of this information is in bin rows. Without multiresolution rendering, calculation of the vertical extents is very cheap as it only requires picking a correct number of MSB bits. With multiresolution rendering, the vertical rasterizer calculates the same undistorted bounding box as the primitive assembler does for shader engine selection. In some cases, the vertical rasterizer undistorts the vertical extents of the bounding box, but if the horizontal part of the bounding box is also calculated, the vertical rasterizer is used to eliminate false positive bin rows for narrow and tall triangles. The vertical rasterizer is preferred for this task because with multi-shader-engine configurations each bin column has a certain pattern that has bin rows not belonging to the current binner 1220. Thus, the vertical rasterizer is modified to add a calculation of the undistorted bounding box. The following pseudocode is an example technique for determining the bins that are intercepted by a triangle.

| Determine the first and last spans rows the triangle intercepts |
|---|
| //get rasterizer view of bounding box top and bottom<br>miny = self.undistort_coord(min(y0,y1,y2))<br>maxy = self.undistort_coord(max(y0,y1,y2))<br>// Get integer first and last bin row the triangle touches<br>firstY = math.floor(miny * self.yBinCount) / self.yBinCount<br>lastY = math.ceil(maxy * self.yBinCount) / self.yBinCount |

The horizontal rasterizer receives the current bin row Y from the vertical rasterizer together with all the triangles touching the current bin row Y on successive clock cycles. In response to the horizontal rasterizer receiving each triangle, the horizontal rasterizer calculates left most and right most intersection points the triangle touches between the bin row top and bottom boundaries. To enable multiresolution rendering, the horizontal rasterizer it is also configured to distort (on the basis of the distortion function) the bin row top and bottom Y coordinates to be used to solve horizontal intersection points and undistort (on the basis of the distortion function) the calculated horizontal intersection points to determine which bins the horizontal span covers. The following pseudocode is an example of the processing performed by the horizontal rasterizer.

| //Horizontal processing |
|---|
| for i in range(self.yBinCount) :<br>    # Use distort sample rows<br>    topY = self.distort_coord(sampleRows[i])<br>    botY = self.distort_coord(sampleRows[i + 1])<br>    binSpan = self.getBinRowExtents(topY, botY, x0, y0, x1, y1, x2, y2)<br>    if binSpan :<br>        # Undistort span left and right endpoints<br>        lx, rx = binSpan<br>        lx = self.undistort_coord(lx)<br>        rx = self.undistort_coord(rx) |

The binner 1220 outputs triangles to scan converter 1225 together with a scissor rectangle set to current bin boundaries. With multiresolution rendering, the amount of original viewport seen "through" each bin is different. This is achieved by calculating a unique scale and offset for each bin to apply to the triangle vertices before being sent to the scan converter 1225. In the case of larger bins, the FBW 1230 is programmed to adjust the output bin size within its ability to subdivide or aggregate the bins. In some embodiments, scale and offset are calculated by warping the scissor rectangle coordinates to warped space and calculating the size and offset difference between the original and warped scissor rectangles. The scale and offset modify the vertex XY positions. This is implemented by moving a gradient set up calculation from a primitive assembler to the scan converter 1225. Otherwise, the output of the binner 1220 would have to scale also the barycentric and Z gradients, which would require extra arithmetic. The following pseudocode illustrates example operation of the binner 1220 and the FBW 1230.

| //output and FBW - call distortTriangleToBin to create each output |
|---|
| def distortTriangleToBin(self, binX0, binY0, binX1, binY1, x0, y0, x1, y1, x2, y2) :<br>        # distort the bin rectangle to distorted sample space<br>        wx0 = self.xdistort_coord.get(binX0)<br>        wy0 = self.ydistort_coord.get(binY0)<br>            wx1 = self.xdistort_coord.get(binX1) |

```
//output and FBW - call distortTriangleToBin to create each output
    wy1 = self.ydistort_coord.get(binY1)
    # Calculate X & Y scale factors from the size difference
    # between non-distorted and distorted bin rectangle
    xScale = (binX1 - binX0) / (wx1 - wx0)
    yScale = (binY1 - binY0) / (wy1 - wy0)
    # This is used to transform triangle so that
    # distorted bin rectangle corner is at the origin
    preXTrans = -wx0
    preYTrans = -wy0
    # This is used to transform triangle back so that
    # distorted triangle is relative to the bin
    postXTrans = binX0
    postYTrans = binY0
    # Transform the triangle
    tx0 = (x0 + preXTrans) * xScale + postXTrans
    ty0 = (y0 + preYTrans) * yScale + postYTrans
    tx1 = (x1 + preXTrans) * xScale + postXTrans
    ty1 = (y1 + preYTrans) * yScale + postYTrans
      tx2 = (x2 + preXTrans) * xScale + postXTrans
    ty2 = (y2 + preYTrans) * yScale + postYTrans
    return (tx0, ty0, tx1, ty1, tx2, ty2)
```

In summary, a primitive assembler is configured to undistort triangle bounding box to determine shader engine that is to get the primitive. A vertical rasterizer in the binner 1220 undistorts a bounding box for the primitive and the horizontal rasterizer distorts the top and bottom boundaries of a bin row. The horizontal rasterizer also undistorts the horizontal span endpoints. Output from the binner 1220, and in some cases the FBW 1230, is used to calculate a scale and offset for the current bin and apply the scale and offset to the triangle vertex positions. A set up function is then be moved to a point in the graphics pipeline following the binner 1220. This allows the set up unit to calculate the triangle slopes normally using the new and modified triangle vertex positions output by the binner 1220 or the FBW 1230.

Figure 13:
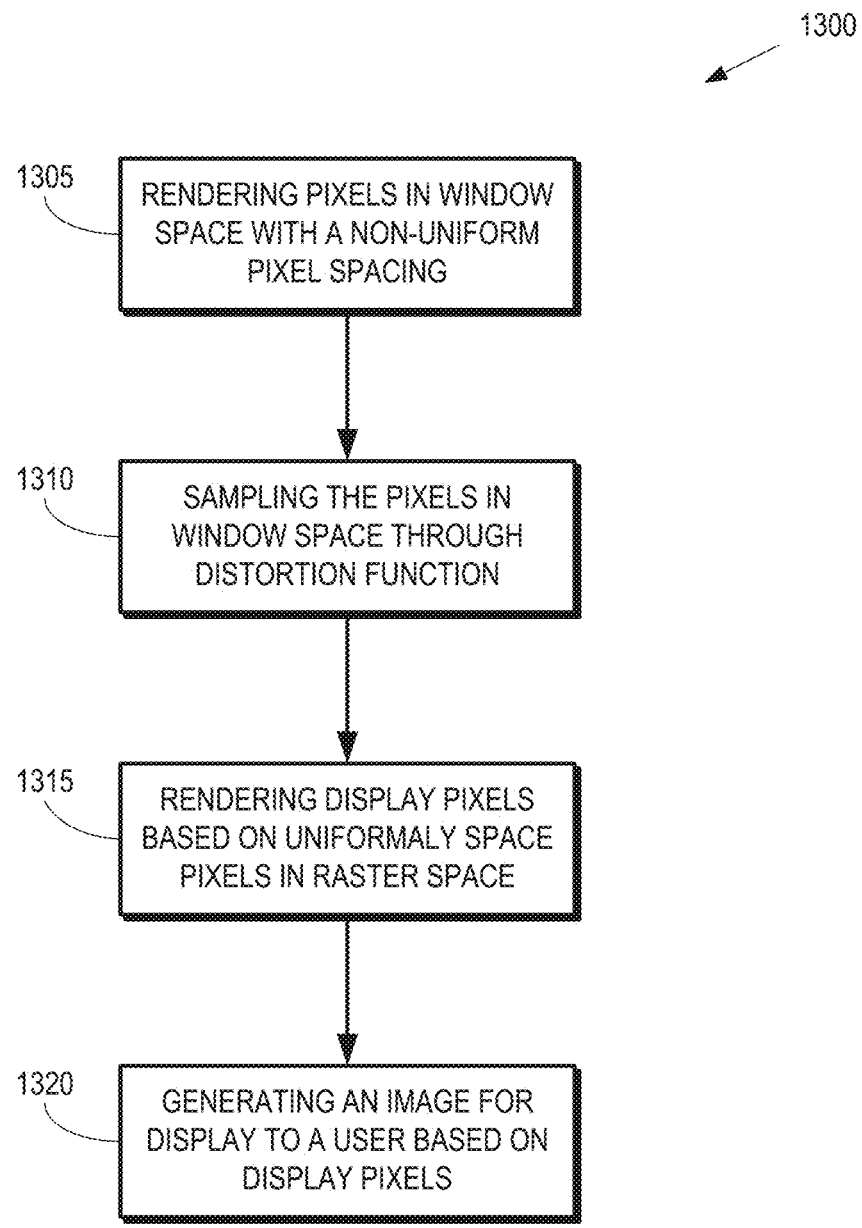
FIG. 13 is a flow diagram of a method for rendering sampling non-uniform pixels in a window space through a distortion function according to some embodiments.

FIG. 13 is a flow diagram of a method 1300 for rendering sampling non-uniform pixels in a window space through a distortion function according to some embodiments. The method 1300 is implemented in some embodiments of the graphics pipeline 100 shown in FIG. 1, the electronic device 205 shown in FIG. 2, and the electronic device 305 shown in FIG. 3.

At block 1305, the geometry pipeline renders pixels in window space with a non-uniform pixel spacing. At block 1310, the non-uniformly spaced pixels in window space are sampled through a distortion function. At block 1315, a scan converter renders display pixels based on uniformly spaced pixels in raster space. The uniformly spaced pixels are determined by sampling the non-uniformly spaced pixels through the distortion function. At block 1320, an image is generated for display to a user based on the display pixels.

In some embodiments, the apparatus and techniques described above are implemented in a system comprising one or more integrated circuit (IC) devices (also referred to as integrated circuit packages or microchips), such as the graphics pipeline described above with reference to FIGS. 1-13. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   rendering, in a graphics pipeline, pixels in window space with a non-uniform pixel spacing;
   sampling, with a scan converter, the pixels in window space through a distortion function that maps the non-uniformly spaced pixels in window space to uniformly spaced pixels in raster space;
   rendering, at the scan converter, display pixels based on the uniformly spaced pixels in raster space; and
   generating an image for display to a user using the display pixels.

2. The method of claim 1, wherein rendering the pixels in the window space with the non-uniform pixel spacing comprises rendering the pixels in the window space such that a pixel density per subtended area is constant across a field of view of the user.

3. The method of claim 2, wherein rendering the pixels in the window space comprises rendering the pixels in the window space such that the pixel density per subtended angle is relatively high in a fovea region associated with the user and relatively low on a visual periphery associated with the user.

4. The method of claim 1, wherein sampling the pixels in window space through the distortion function comprises sampling the pixels in window space through a vertical distortion function that maps a first dimension of the non-uniformly spaced pixels in window space to the uniformly spaced pixels in raster space and a horizontal distortion function that maps a second dimension of the non-uniformly spaced pixels in window space to the uniformly spaced pixels in raster space.

5. The method of claim 4, wherein the vertical and horizontal distortion functions are defined by corresponding sets of displacements from a linear function that maps uniformly spaced pixels in window space to the uniformly spaced pixels in raster space.

6. The method of claim 5, further comprising:
   determining a fovea region for the user; and
   modifying the vertical and horizontal distortion functions to increase a resolution of pixels in a portion of the window space that corresponds to a location of the fovea region.

7. The method of claim 1, further comprising:
   comparing a bounding box for a primitive to boundaries of the non-uniformly spaced pixels in window space; and
   routing the primitive through the graphics pipeline based on the comparison.

8. The method of claim 7, further comprising:
   binning samples for the primitive based on intersections of the primitive with the non-uniformly spaced pixels in window space.

9. An apparatus comprising:
   at least one processor configured to implement a graphics pipeline that renders pixels in window space with a non-uniform pixel spacing;
   a distortion function that maps the non-uniformly spaced pixels in window space to uniformly spaced pixels in raster space; and
   a scan converter configured to:
      sample the pixels in window space through the distortion function; and
      render display pixels used to generate an image for display to a user based on the uniformly spaced pixels in raster space.

10. The apparatus of claim 9, wherein the at least one processor is configured to render the pixels in the window space such that a pixel density per subtended area is constant across a field of view of the user.

11. The apparatus of claim 10, wherein the at least one processor is configured to render the pixels in the window space such that the pixel density per subtended angle is relatively high in a fovea region associated with the user and relatively low on a visual periphery associated with the user.

12. The apparatus of claim 9, wherein the scan converter is configured to sample the pixels in window space through a vertical distortion function that maps a first dimension of the non-uniformly spaced pixels in window space to the uniformly spaced pixels in raster space and a horizontal distortion function that maps a second dimension of the nonuniformly spaced pixels in window space to the uniformly spaced pixels in raster space.

13. The apparatus of claim 12, wherein the vertical and horizontal distortion functions are defined by corresponding sets of displacements from a linear function that maps uniformly spaced pixels in window space to the uniformly spaced pixels in raster space.

14. The apparatus of claim 13, wherein the at least one processor is configured to:
   determine a fovea region for the user; and
   modify the vertical and horizontal distortion functions to increase a resolution of pixels in a portion of the window space that corresponds to a location of the fovea region.

15. The apparatus of claim 9, wherein the at least one processor is configured to:
   compare a bounding box for a primitive to boundaries of the nonuniformly spaced pixels in window space; and
   route the primitive through the graphics pipeline based on the comparison.

16. The apparatus of claim 15, wherein the at least one processor is configured to:
   bin samples for the primitive based on intersections of the primitive with the nonuniformly spaced pixels in window space.

17. A head mounted device (HMD) comprising:
   a display to present images to a user wearing the HMD;
   at least one processor configured to implement a graphics pipeline that renders pixels in window space with a non-uniform pixel spacing; and
   a scan converter configured to:
      sample the pixels in window space through a first distortion function that maps the non-uniformly spaced pixels in window space to uniformly spaced pixels in raster space; and
      render, based on the uniformly spaced pixels in raster space, display pixels that are provided to the display to generate images for presentation to the user.

18. The HMD of claim 17, wherein the at least one processor is configured to render the pixels in the window space such that a pixel density per subtended area is constant across a field of view of the user.

19. The HMD of claim 17, wherein the at least one processor is configured to implement a second distortion function that is applied to the rendered display pixels prior to provision to the display.

20. The HMD of claim 17, wherein the at least one processor is configured to:
   determine a fovea region for the user; and
   modify the first distortion function to increase a resolution of pixels in a portion of the window space that corresponds to a location of the fovea region.

* * * * *